United States Patent

[11] 3,576,430

[72] Inventors William E. Fickenscher
Baltimore;
James E. Harris, Owings Mills, Md.
[21] Appl. No. 724,855
[22] Filed Apr. 29, 1968
[45] Patented Apr. 27, 1971
[73] Assignee The Bendix Corporation

[54] OPTICAL TICKET READER AND ENCODING MEANS
7 Claims, 7 Drawing Figs.

[52] U.S. Cl. .......... 235/61.11, 250/227
[51] Int. Cl. .......... G06k 7/14, G02b 5/16, H01i 5/16
[50] Field of Search .......... 235/61.115; 250/227; 235/61.603

[56] References Cited

UNITED STATES PATENTS

| | | | |
|---|---|---|---|
| 3,201,569 | 8/1965 | Conron | 235/61.603X |
| 3,215,135 | 11/1965 | Franke | 235/61.115X |
| 3,284,929 | 11/1966 | Azure | 235/61.603X |
| 3,305,689 | 2/1967 | Leavy | 250/227 |
| 3,342,978 | 9/1967 | Cameron | 235/61.115 |
| 3,418,456 | 12/1968 | Hamisch | 235/61.115 |
| 3,430,057 | 2/1969 | Genahr | 250/227 |

*Primary Examiner*—Daryl W. Cook
*Assistant Examiner*—Robert M. Kilgore
*Attorneys*—Plante, Arens, Hartz and O'Brien, Bruce L. Lamb and William G. Christoforo

ABSTRACT: An optical ticket reader and encoding means utilizing fiber optics for illuminating and reading a specially prepared ticket or other surface having optically recognizable indicia arranged on an optically recognizable background. A ticket is passed over a plurality of sensors, one sensor being provided for each group of indicia to be read, which illuminate and read the ticket. The information thus read is then encoded in binary form. Additionally, keying indicia on the ticket are provided to indicate the general information contained on the ticket, these keying indicia being read by the reader and interpreted by the encoder to form a binary bit train correlative to the information read. The keying indicia are also used by the optical ticket reader to check the accuracy of the optical reader.

INVENTORS
JAMES E. HARRIS
WILLIAM E. FICKENSCHER

BY William G. Christoforo
ATTORNEY

INVENTORS
JAMES E. HARRIS
WILLIAM E. FICKENSCHER
BY William G. Christoforo
ATTORNEY

INVENTORS
JAMES E. HARRIS
WILLIAM E. FICKENSCHER

BY William G. Christoforo
ATTORNEY

JAMES E. HARRIS
WILLIAM E. FICKENSCHER
INVENTORS

BY William G. Christoforo
ATTORNEY

INVENTORS
JAMES E. HARRIS
WILLIAM E. FICKENSCHER
BY William G. Christoforo
ATTORNEY INVENTORS
JAMES E. HARRIS
WILLIAM E. FICKENSCHER
BY William G. Christoforo
ATTORNEY

OPTICAL TICKET READER AND ENCODING MEANS

BACKGROUND OF THE INVENTION

Automatic access to material storage facilities, wherein the stored material can be made to move past the point of access is conveniently made through the use of optical readers where the access information can be reduced to optically recognizable indicia arranged on an optically recognizable background.

BRIEF SUMMARY OF THE INVENTION

Accordingly, an optical ticket reader and encoding means has been devised for reading specially designed tickets which contain various types of information the information being determined by the arrangement of indicia on the ticket. The ticket indicia are arranged in ordered columns and rows so that when the ticket is passed over the ticket reader indicia columns are read simultaneously and indicia rows are read sequentially. Thus, one sensor is provided for each indicia row which is to be read.

Each sensor, generally, consists of a bundle of fiber optics which is illuminated at one end by a lamp, while the other end of which illuminates a photosensitive transistor. A discontinuity in the fiber bundle prevents direct optical communication between the lamp and the photosensitive cell. This discontinuity is arranged on a surface of the optical reader across which the specially prepared ticket is passed so that the discontinuity scans one row of indicia column by column as it passes thereover. The ticket background and the indicia marked thereon alternately bridge and unbridge the discontinuity so as to pass light thereover to the photosensitive cell.

A threshold sensor circuit converts the optical reading into a binary bit train which can be suitably stored in a shift register for further use.

It is thus an object of this invention to provide an optical ticket reader for automatically reading specially prepared tickets.

It is another object of this invention to provide a circuit for converting optical information into electrical binary information.

It is another object of this invention to provide a means for validating the optical reading of a ticket.

It is still another object of this invention to provide a means to arrange the information read by an optical reader into an ordered electrical form.

DESCRIPTION OF THE PREFERRED EMBODIMENT

This description will be concerned with an optical ticket reader and encoding means such as might be used for access to an automatic baggage handling system located in an airplane terminal. This will clearly illustrate how a single optical ticket reader can be used to read various size tickets where the size of the ticket and coding of indicia thereon indicates the informational content of the particular ticket.

Figure 1:
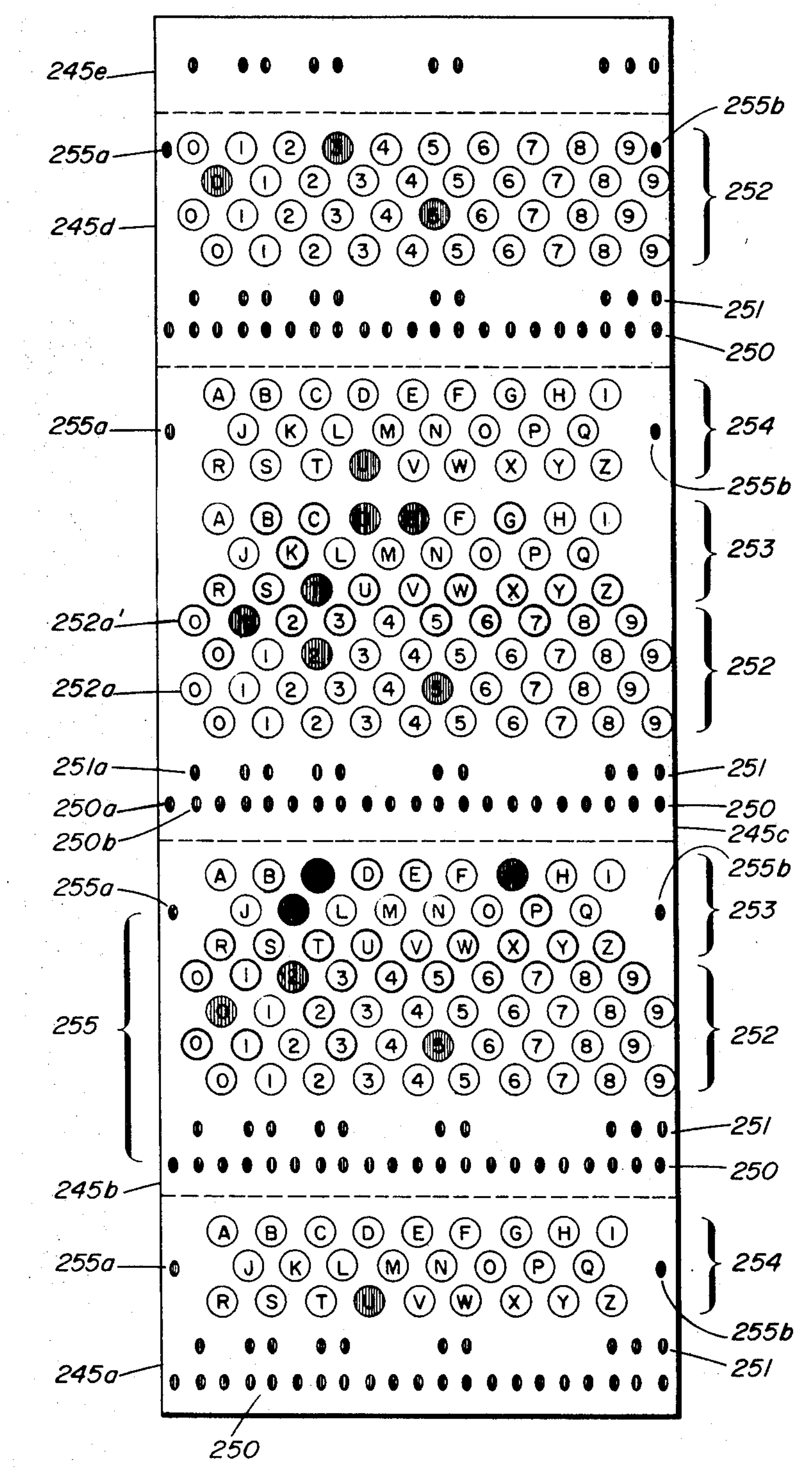
FIG. 1 shows a ticket having information encoded thereon.

Referring to FIG. 1, a baggage claim ticket such as might be used by an airline for access to an automatic baggage handling system which is installed at an airline terminal, is seen. The baggage ticket 245 consists os segments **245*a*, 245*b*, 245*c*, 245*d* and 245*e*. Each ticket segment includes a baggage claim number located on each segment at line 251 and coded by indicia adapted to be ready by an optical ticket reader. The baggage claim number might also be printed in standard numerals superimposed on the coded indicia. However, these standard numerals will be so printed so as not to be read by the optical ticket reader. The baggage ticket shown is used for a trip requiring one interchange. Ticket segment 245*a* is retained by the passenger for his access into the baggage handling system at the termination of his trip. The remainder of the ticket is attached to the bag and the various ticket segments are removed at key stages of the trip and read by an optical ticket reader with the information at that stage of the trip being used to route the baggage to the proper destination. Thus, ticket segment 245*b* is removed from the ticket at the passenger's initial departure point and contains information in ticket section 252 as to the initial flight number and in ticket section 253 as to the destination of initial phase of the flight. Clock indicia are located on each ticket segment on line 250 and are used to strobe the ticket reader in a manner to be described. Key indicia 255*a* and 255*b* located on each side of the segment are located a distance 255 from the first and last clock indicia. The distance 255 is interpreted by the optical ticket reader to identify the ticket segment and hence the information contained thereon then being read. Ticket segment 245*c*, which is detached from the ticket and read at the first interchange, contains, in addition to the information contained on ticket segment 245*b*, the additional information in ticket section 254 identifying the carrier for the second stage of the passenger's trip. Ticket segment 245*d*, which is removed at the end of the trip and read by an optical ticket reader, contains the clock indicia on line 250, the coded baggage claim number on line 251 and information identifying the final flight number in ticket section 252**.

Figure 2:
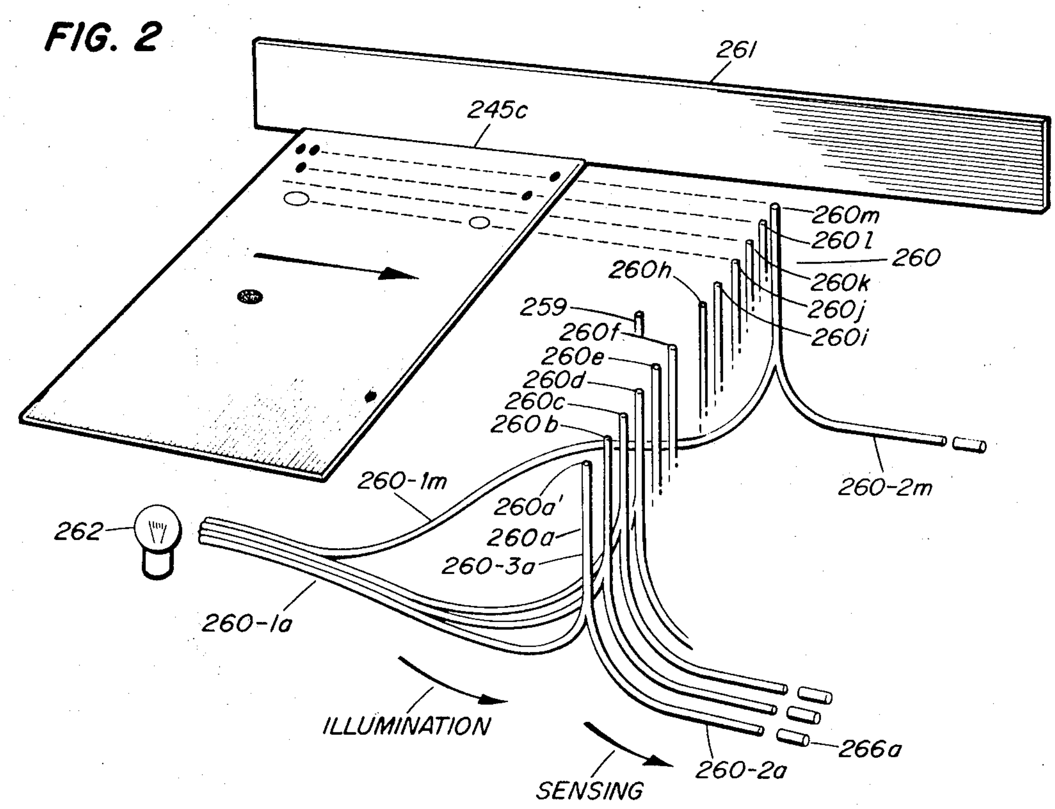
FIG. 2 is a functional view of an optical ticket reader built in accordance with the teachings of this invention.

Referring now to FIG. 2, there is seen the top surface of an optical reader with a baggage ticket segment located thereon about to be passed over a start sensor 259 which responds to a ticket placed over it and ticket reading sensors 260. The ticket segment is arranged on the optical ticket reader face down with the horizontal row of clock indicia located along a vertical guide 261. The bottom edge of the ticket segment is slid along the vertical guide and the ticket thus passed over the ticket reading sensors 260. The sensors are aligned to read a column of data simultaneously. A column of data is that information contained vertically above a clock indicium. Therefore, referring again to FIG. 1, one column of data, for example, consists of clock indicia **250*a* and key indicia 255*a*, while a second column of data consists of clock indicia 250*b*, baggage claim indicia 251*a* and flight number numerals 252*a* and 252*a*'. The clock indicia prevent multiple readings of a data column. Keying indicia 255*a* and 255*b*** not only indicate ticket size, but also indicate the beginning and the end of the ticket reading process.

Returning to FIG. 2, a typical optical reader sensor **260*a* is seen to consist of a bundle of fiber optics having a trunk 260–3*a* and legs 260–1*a* and 260–2*a*. Leg 260–1*a* communicates with a light source 262 and conducts light from the light source to sensor discontinuity 260*a*'. A surface passing over discontinuity is thus illuminated. Light is reflected from the illuminated surface back into the discontinuity and is conducted through the fibers of leg 260–2*a* to photosensitive transistor 266*a* which thereby responds to the illuminated surface and indicia thereon passing over the sensor discontinuity. Photosensitive transistor 266*a* comprises the input element of a sensor circuit which is driven to generate an output for each indicium passing over discontinuity 260*a*'. The discontinuity 260*a*' thus constitutes an optical discontinuity between lamp 262 and photosensitive transistor 266*a***, with the discontinuity being bridged by a surface having light reflective characteristics.

The fibers of leg **260–1*a* are intermixed with the fibers of leg 260–2*a* in trunk 260–3*a* so that the fiber ends in discontinuity 260*a*'** which illuminate the surface passing thereover are uniformly intermixed with the fiber ends receiving the reflected light so that the surface passing over the discontinuity is illuminated and sensed evenly.

Figure 3:
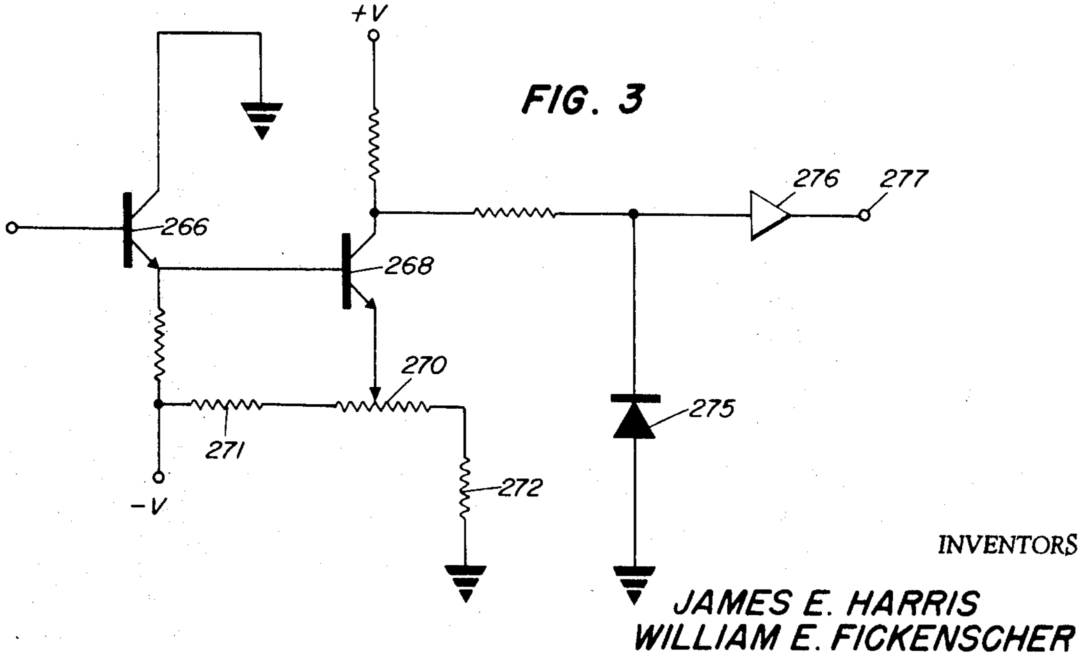
FIG. 3 is a schematic of a sensor circuit used to convert optical information into electrical information.

Referring now to FIG. 3, a typical sensor circuit photosensitive transistor 266 becomes conductive when exposed to light, thereby causing its emitter voltage to rise. Since transistor 266 emitter is connected directly to the base of the transistor 268, the rising emitter voltage causes transistor 268 to turn on. Transistor 268 emitter voltage is set by resistors 271 and 272 and the setting of potentiometer 270, which comprise a threshold determining the light intensity which will cause the sensor circuit to respond. When transistor 268 becomes conductive, its collector voltage drops thereby causing diode 275 cathode voltage to drop so that the diode also becomes conductive. It can thus be seen that the conductive state of diode 275 depends on the setting of the threshold comprised of resistors 271, 272, and potentiometer 270 and the amount of light incident on transistor 266, with diode 275 conductive when transistor 266 is activated and with diode 275 shutoff when transistors 266 is nonconducting. The signal at the cathode of diode 275 is amplified by amplifier 276 and appears on terminal 277.

Figure 4:
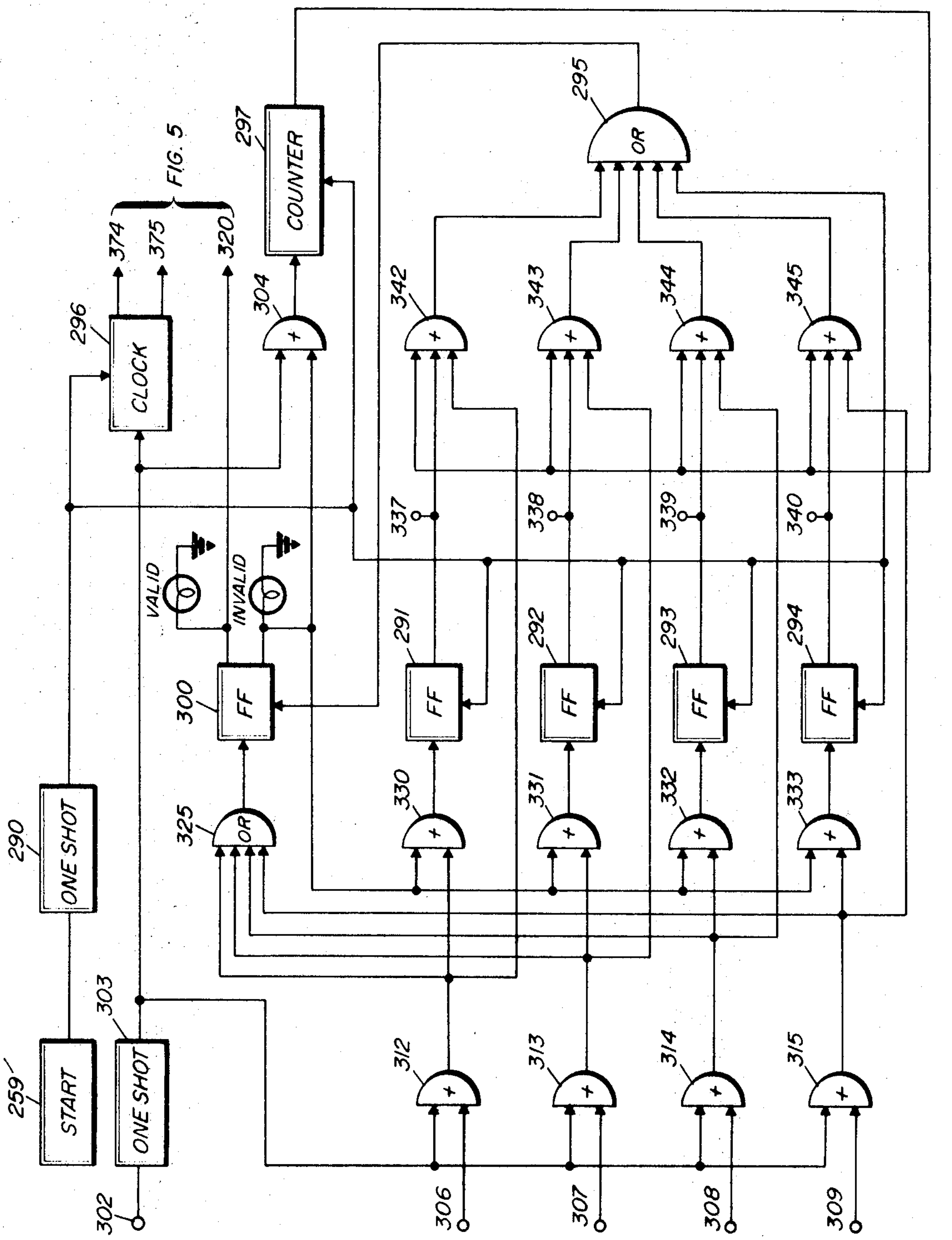
FIGS. 4, 5 and FIGS. 6A and 6B, taken together, comprise a block diagram of means for converting the output of the optical ticket reader into an electrical train of binary bits.

Referring now to FIG. 4, a start signal generated by the start sensor and its associated sensor circuit 259′ when a ticket segment covers this sensor, is applied to one shot 290, thereby triggering the one shot to apply a reset pulse to flip-flops 291, 292, 293, 294 and 296 and additionally a reset pulse to counter 297. This reset pulse is also applied through OR gate 295 to reset flip-flop 300. Thereafter strobe pulses which are generated when clock indicia pass over sensor 260*m*, are applied to terminal 302 and trigger one shot 303 one time for each clock indicium. The resulting pulses are applied to clock flip-flop 296 which performs a function which will be explained in greater detail later. One shot 303 pulses are also applied via AND gate 304 to counter 297 which produces an output at the end of 21 counts, which is the number of clock indicia on the ticket being read. The counter 297 output is used to validate the ticket in a manner also to be described at a later time.

Examination of a ticket in FIG. 1 will show that the first clock indicium and a key indicium will be read simultaneously. Therefore, simultaneously with the application of the first clock indicium pulse to terminal 302, a key pulse will be applied to one of terminals 306, 307, 308 or 309, depending on the size of the ticket segment being read. Assuming now the ticket segment 245*c* is being read, it can be seen that the clock indicia is separated from the key indicia by distance 255, thus a key pulse will appear on terminal 309 and be applied to AND gate 315. This gate being qualified by one shot 303, the key pulse will pass therethrough and through OR gate 325 to place flip-flop 300 into the set state. In the set state, flip-flop 300 qualifies gate 304 through which the clock pulses generated by one shot 303 pass to counter 297 and, additionally, the set state of flip-flop 300 qualifies AND gates 330 and 333. The key pulse can thus also pass through gates 315 and 333 and triggers flip-flop 294 into the set state, hence causing a voltage signal to appear on terminal 340 and at one input of AND gate 345. Of course, if a different sized ticket segment had been read so that the key pulse appeared at one of the other terminals 306 to 308, the corresponding flip-flop 291 and 293 would have been triggered into the set state with the proper terminal 337 to 339 energized and an input appearing at one of the gates 342 and 344. During the time that this particular ticket segment is being read terminal 340 remains energized.

Figure 5:
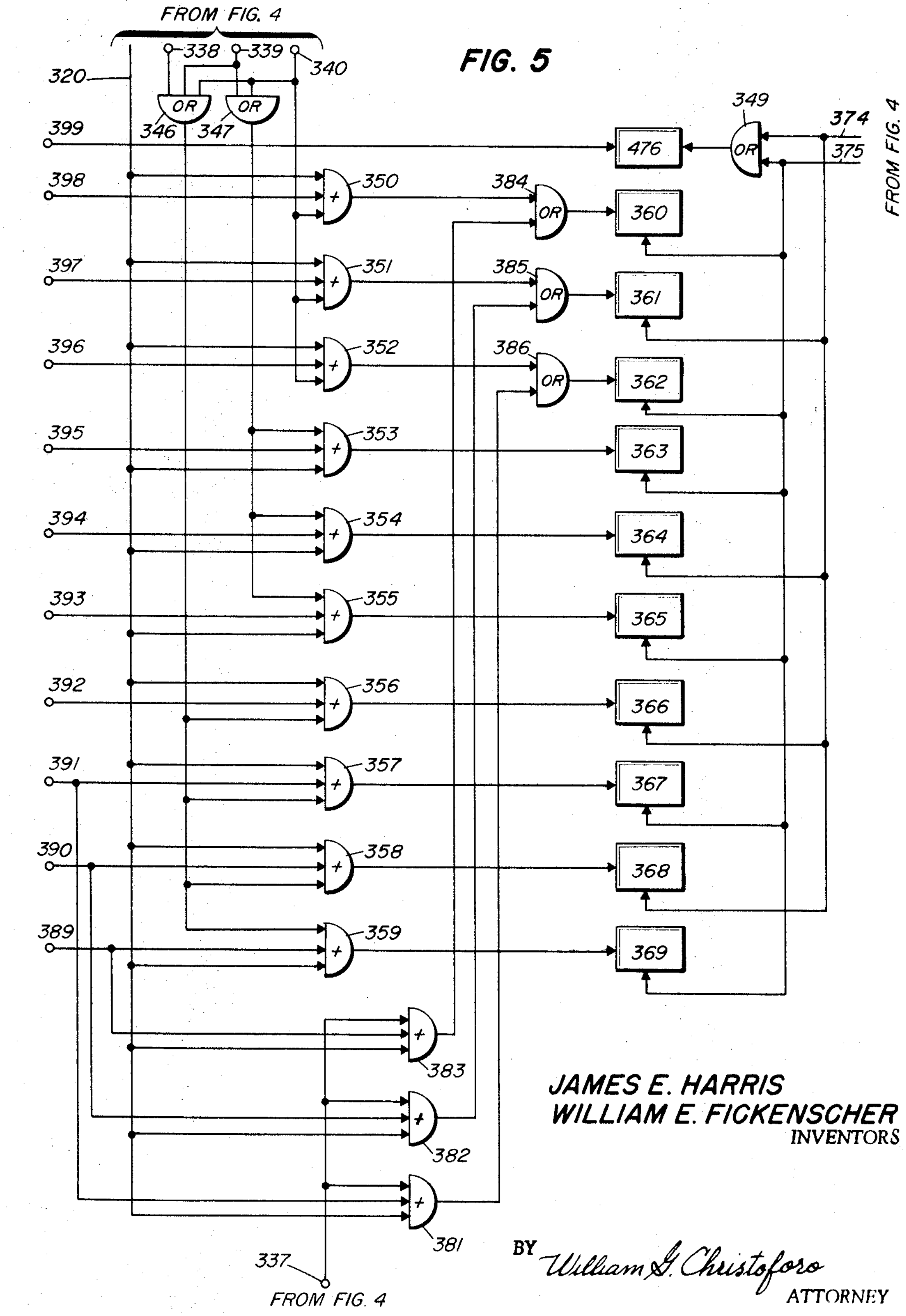

Referring now also to FIG. 5, the voltage on terminal 340 qualifies AND gates 350 and 359, gates 353 to 355 being qualified through OR gate 347, while gates 356 to 359 are qualified through OR gate 346. Terminals 389 to 399 are connected to receive the output from sensor circuitry associated with sensor 260*a*to 260 1, respectively, which are seen FIG. 2, Marked indicia passing over the sensors induce in their respective sensor circuitry signals which pass through the proper qualified gates to the shift registers 360 to 369. Clock indicia which are passing over sensor 260*m* continue to strobe one shot 303, the output pulses of which in turn strobe clock flip-flop 296 to produce alternate odd and even clock pulses. These odd and even clock pulses are transmitted via lines 374 and 375 to the shift registers with the odd clock pulses being applied to shift registers 361, 364, 366, and 368, while the even clock pulses are applied to shift registers 360, 362, 363, 365, 367 and 369. The ticket number encoded on line 251 of the baggage ticket is encoded, in like manner, in a 21-bit shift register 476, which is strobed by both the even and odd clock pulses. At the completion of the reading of the baggage ticket segment when the last clock indicia and its associated key indicia pass over their respective sensors, a key pulse will once again appear on terminal 309. This pulse passes through gate 315 and is applied to gate 345 along with a 21-count pulse from counter 297. These pulses pass through gate 345, which has been previously qualified by the flip-flop 294, OR gate 295 to the reset terminal of flip-flop 300. When this flip-flop assumes its reset condition a valid light is lit on the face of the ticket reader, thereby informing the operator that the ticket has passed through the optical reader properly positioned.

If, however, the trailing key indicia of the baggage segment being read fails to excite the same terminals 306 to 309 as has been excited by the leading key indicia, the flip-flops 291 to 294 will not have been placed in the set condition so as to qualify the corresponding gate 342 to 345, so that the pulse associated with the trailing key indicia will not be able to pass therethrough to place flip-flop 300 into the reset condition. The invalid light will thus remain lit until the ticket is once again passed over the sensors of the ticket reader.

In like manner other sections of the ticket may be read with the spacing 255 between the key and clock indicia being recognized by the proper signals on terminals 306 to 309 so as to identify the ticket segment being read. Of particular note is the reading of ticket segment 245*a* in which the key indicia excite terminal 306. When this terminal is excited a voltage appears during the reading of the ticket on terminal 337, thereby qualifying gates 381 to 383, while gates 350 to 359 remain closed. The ticket information then appearing on terminals 389 to 391 may pass through qualified gates 381 to 383 and OR gates 384 to 386 so that this information will be stored in shift registers 360 to 362. In this manner, information as to the baggage ticket number is stored in shift register 476 while information as to the carrier is stored in shift registers 360 to 362, information as to destination is stored in shift registers 363 to 365 and information as to flight number is stored in shift registers 366 to 369 regardless of the size ticket segment read.

Figure 6A:
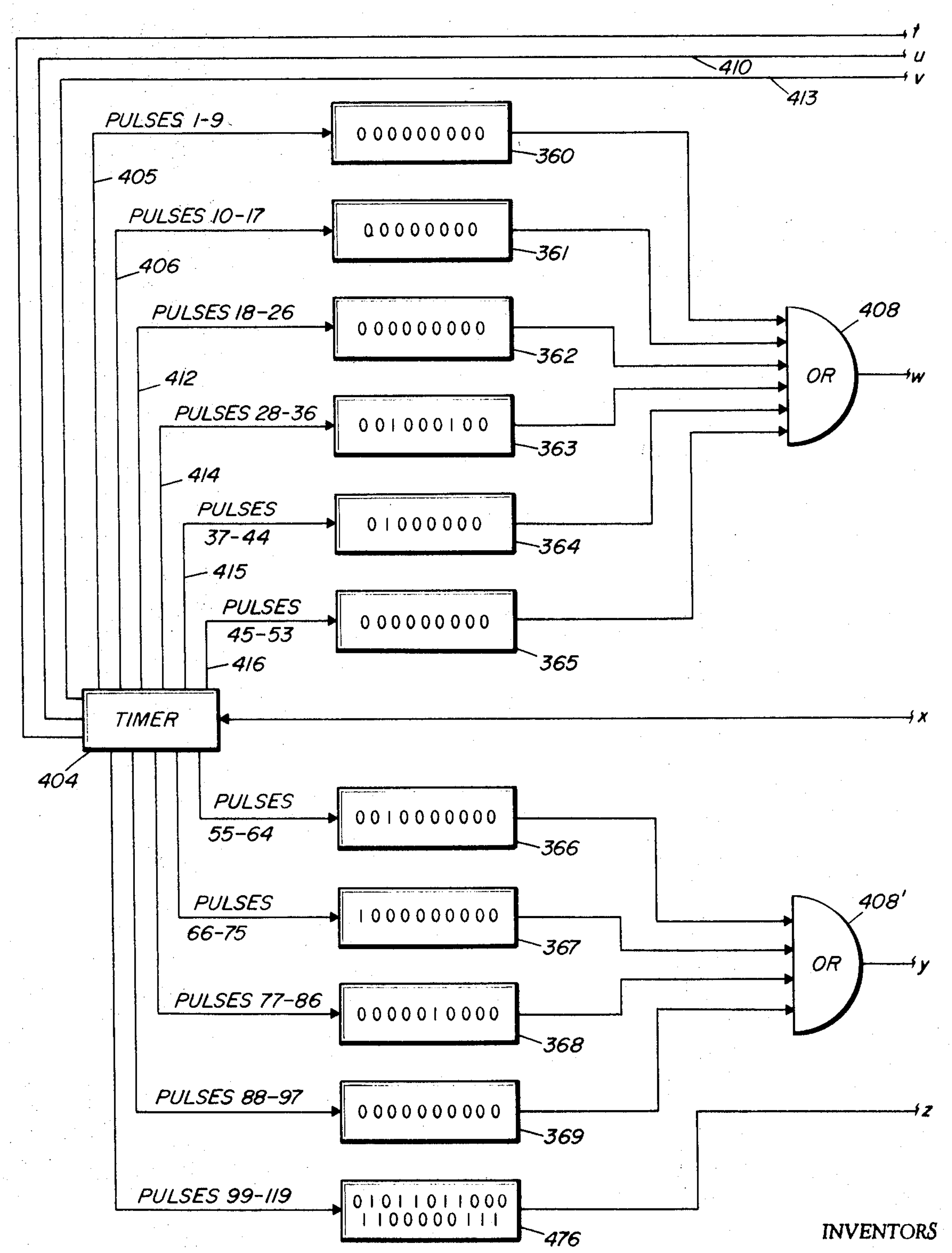
Figure 6B:
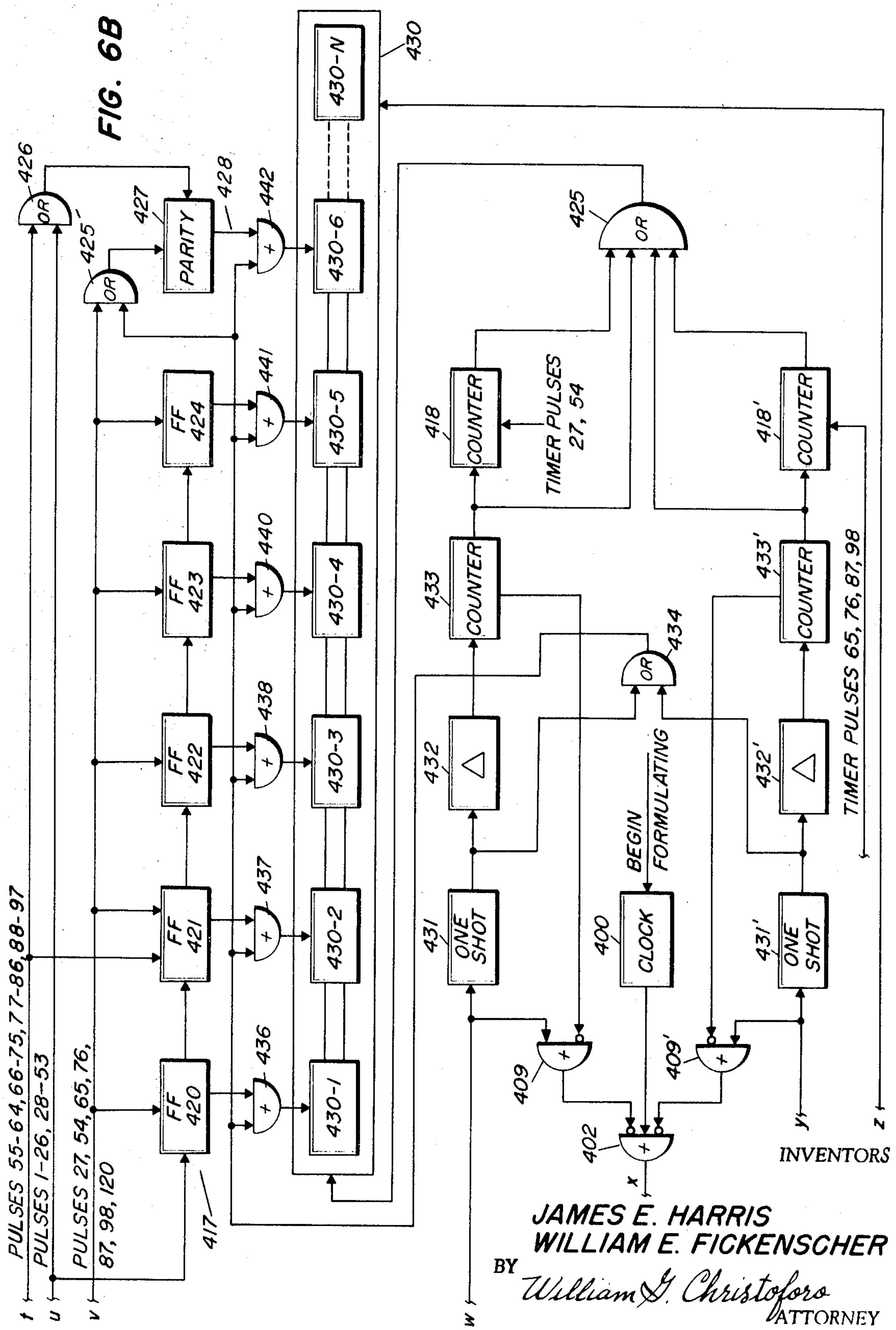

Referring now to FIGS. 6A and 6B and assuming that the ticket segment 245*b* as shown in FIG. 1 has been read and the information stored in shift registers 360 and 369 and shift register 476, it can be seen that since this particular ticket segment contained no information identifying the carrier that shift registers 360 to 362 would contain only 0's. Shift register 363 contains information as to the marking of the first line of this particular ticket segment, that is the line showing the alphabetic characters A to I wherein the characters C and G are marked. Shift register 364 contains information as to the second line on the ticket segment, that is, it indicates that the second letter on that line, K, is marked. In like manner shift register 365 indicates that no character on the third ticket line is marked, while shift registers 366, 367, 368 and 369 indicate the markings on the fourth, fifth, sixth, and seventh lines of the ticket segment respectively. The baggage ticket code, of course, is stored in shift register 476. After the ticket segment has been read and the valid light on the ticket reader goes on indicating that the information on the ticket is properly coded in the aforementioned shift registers, a "begin formating" signal is applied to clock 400, suitably by closure of a switch, (in a manner to be explained later,) so as to enable this clock to apply pulses through AND gate 402 to timer 404. Briefly, the timer comprises a plurality of counting circuits which are strobed by clock pulses applied from clock 400, and whose structure should be obvious from a description of the output taken therefrom. The timer outputs generally consist of strings of pulses whose pulse repetition rate is the same as that of clock 400, these pulse strings appearing in predetermined order on the various timer output lines. The first nine counter pulses, that is pulses 1 to 9, are applied to strobe shift register 360, which it will be remembered contains all 0's. Pulses 10 to 17 strobe shift register 361 while pulses 18 to 26 are applied on line 412 to strobe shift register 362. These last two shift registers also contain all 0's, hence they produce no output while being strobed. At the same time, timer pulses 1 to 26 are applied by line 410 to the five stage counter 417 comprises of flip-flop 420 to 424. At timer pulse 27 a counter pulse is applied via line 413 to reset these last mentioned flip-flops to zero and through OR gate 425' to reset the parity counter. Simultaneously timer pulse 27 is also applied to a count of 18 timer 418 which upon being thus triggered, counts from a presently acquired count to a total of 18, these counts appearing as pulses on output line 419 so as to be applied through OR gate 425 to master shift register 430 comprised of flip-flops 430–1 to 430–N. These counter 418 output pulses shift the register once for each pulse; however, since this master shift register is already at zero, no change occurs.

Timer pulses 28 to 36 are applied via line 414 to strobe shift register 363, which it can be seen contains 1's indicating the location of blackened indicia on the ticket segment. At timer pulse 30 a 1 appears at the output of this shift register and is applied through OR gate 408 and AND gate 409 to an inhibit terminal of AND gate 402, thus preventing clock pulses from clock 400 from reaching timer 404, thus disabling this timer. Additionally, this pulse issuing from shift register 363 also triggers one shot 431, the output of which is applied through OR gate 434 to qualify AND gates 436 to 442. Timer pulse 28, 29 and 30 have also been applied via line 410 to counter 417, so that this counter now contains the numeral 3 in binary form. A parity counter 427 also receives through OR gate 426 pulses 28, 29 and 30. The parity counter calculates the number of binary 1's in its count and applies a gate 442 qualifying pulse along line 428 should this number of binary 1's be odd. In this case, since the count is 3, the number of 1' s in the parity counter is even. Hence, upon the opening of gate 442 by the one shot 431 output pulse a binary 0 is transferred into flip-flop 430–6. At the time, the qualification of gates 436 to 441 shifts the binary number contained in counter 417 down into the master register 430. The one shot 431 output pulse, after a short delay introduced by delay 432, triggers counter 433 which in response thereto generates a string of six pulses which are applied through OR gate 425 to master register 430, thereby causing the number just transferred into this register to be shifted six spaces. The counter 433 output pulses are also accumulated in counter 418 to be used later in a manner to be described.

It will be remembered that the timer stopped counting at pulse 30 when the clock pulses strobing it through gate 402 were turned off by the inhibiting of this gate. The sixth count from counter 433 is also applied to inhibit gate 409, thus turning off the gate 402 inhibit signal so that the clock pulses can once again strobe the timer. The timer, thus, once again resumes generating its output pulses resuming at pulse 31. As before, these pulses continue to accumulate in counter 417 and to strobe shift register 363. At timer pulse 34, once again, a digital 1 emerges from shift register 363 and, once again in the manner previously described, the timer pulse train is interrupted and the number stored in counter 417 is shifted down into register 430, after which the timer again resumes its output pulse train with pulses 35 and 36 strobing register 363 and pulses 37 and 44 strobing register 364. The binary number now stored in register 417 is binary 7, which number contains an odd number of digital 1's. The parity counter 427 which has been accumulating this count starting with pulse 28 determines that an odd number of digital 1's is contained in counter 417 and thus applies a gate 442 enabling signal along line 428. When the information contained in counter 417 is shifted down into register 430 an additional digital 1 is thus transferred into flip-flop 430–6, so that an even number of digital 1's are transferred. In this manner, the number of digital 1's contained in register 430 is at all times even. The validity of the binary train contained in register 430 can be verified by determining that the number of digital 1's in this register is, in fact, even. This is conveniently done by sampling the train with a flip-flop when the train is subsequently removed from register 430. Simultaneously, with the second transferring of a number from counter 417 to register 430 counter 433 is triggered so as to shift register 430 six places, and to store an additional six pulses on counter 418, which now contains 12 pulses. When the digital 1 contained in register 364 is finally strobed out of this register, counter 417 will have counted to the number 16, which in binary form contains an odd number of digital 1's. Hence, as before, when the number is transferred from counter 417 to register 430, a parity digital 1 will be transferred into flip-flop 460–6. As before, counter 433 is triggered to shift register 430 six places and to cause counter 418 to accumulate an additional six pulses to that this latter counter is now full. At timer pulse 44 the last digit stored in register 364 is removed. Since this is a 0, no transfer of information takes place between counter 417 and register 430. Timer pulses 45 to 53 strobe register 365 which contains all 0's so that once again there is no transfer of information into master register 430. At timer pulse 54 counter 417 and parity counter 427 are reset and counter 418 is triggered. Since this counter is already full it produces no output. It should now be obvious that with the system shown a maximum of three letters in ticket section 253 of the ticket shown in FIG. 1 can be blackened in ticket section 254. If less than three letters are blackened in either one of these sections at the completion of the reading of the shift registers associated with these sections, counter 418 will not be filled having either accumulated zero, six or 12 pulses, in which case this counter will be triggered by pulse 27 or 54, depending on whether the shift registers 360 to 362 or 363 to 365 have just been strobed, so as to count the difference between 18 and the number of pulses then stored therein. These counts are applied to the master register 430 through gate 425 so as to place the information in its proper place in the resulting bit train which will finally come to be stored in register 430.

In similar manner timer pulses 55 to 64 strobe shift register 366 with digital 1's stored therein moving out through gates 408' and 409' so as to inhibit gate 402. The main difference in the reading of shift registers 366 to 369 is that each of these registers is read individually, whereas registers 360 to 365 were read in groups of three with registers 360, 361 and 362 comprising one group and registers 363, 364 and 365 comprising a second group. Since these first registers were read in a group of three it required a total of 26 timer pulses to empty all the information contained therein. Counter 417 thus required five flip-flop stages to attain the total count required. Where, as in the case of registers 366 to 369, each register is being read individually, counter 417 requires only four flip-flop stages since the total number now to be accumulated therein is 10. Thus, those timer pulses which strobe registers 366 to 369 are counted into counter 417 at flip-flop 421, the flip-flop 420 being thus short-circuited. As before, parity counter 427 determines the number of digital 1's contained in counter 417 and insures that an even number of digital 1's are shifted into register 430. Since, at each shift in this latter case only five bits are being transferred into master register 430, this is, four information bits and one parity bit, counter 433' need only count to 5, this number now being sufficient to shift register 430 to insure that flip-flops 430–1 and 430–6 are open. When the next digital 1 is strobed. The pulses generated by counter 433' are also accumulated in counter 418', which in accordance with the altered characteristic of the information being now transferred into master register 430, need only be capable of counting to 5. Thus, if a digital 1 is contained in one of the shift registers 366 to 369 at the completion of the reading of that register, counter 418' will be full and thus will cause no further shifting of register 430. If, however, one of the registers 366 to 369 contains all 0's, such as is the case will register 369, at the completion of its reading counter 418' will be empty so it will now triggered to produce an output train of five pulses which will shift register 430 five spaces so as to introduce five 0's into the digital train stored therein. Timer pulses 99 to 119 strobe shift register 476, which contains the baggage ticket number information, which information is delivered in a serial stream to master register 430. This information enters the register at flip-flop 430–5. Baggage ticket numbers are arranged so that it is encoded having an even number of digital 1's, thus the total number of digital 1's finally stored in register 430 will be even since the parity bit which enters register 430 at flip-flop 430–6 just ahead of the baggage ticket number is digital 0.

The binary bit message now stored in register 430 may be strobed out in the conventional manner to form a binary bit train having encoded therein a material handling message, which in this embodiment is a baggage handling message. The message may be transmitted via wire or modulated and transmitted via radio link to various points in the system.

Although we have described only one embodiment of our invention, it should be obvious to one skilled in the art that similar systems can be assembled using the principles of this invention, therefore, we do not wish to limit out invention to the specific form shown and accordingly hereby claim as our invention the subject matter including modifications and alterations thereof encompassed by the true scope and spirit of the appended claims.

We claim:

1. An optical reader for reading a first surface having two reader optically recognizable surface characteristic areas, a first of said areas being the background of said first surface and a second of said areas comprising indicia arranged on ordered vertical columns and horizontal rows in spaced relationship with one another on said first surface, said spaced relationship conveying information, and including a row of clock indicia, one of said clock indicia being in each indicia column and additionally including a first key indicium in vertical spaced relationship with a predetermined one of said clock indicia and a second key indicium in vertical spaced relationship with a predetermined other of said clock indicia, said optical reader comprising:

a second surface adapted for having said first surface slid thereacross in spaced relationship therewith;

a light source;

a plurality of sensors for scanning said indicia, one for each row of indicia to be scanned, each said sensor comprising a light conductive medium including first and second ends and a discontinuity in spaced relationship with said second surface, said medium being conductive to light from said first to said second end when said discontinuity is bridged by one of said surface characteristic areas and nonconductive to light from said first to said second end when said discontinuity is bridged by the other of said surface characteristic ares, said discontinuity being small enough to be bridged by one of said indicia, a said first ends being illuminated by said light source;

a plurality of sensor circuits, one for each said sensor, each said sensor circuit including a photosensitive cell illuminated by said second end when said discontinuity is bridged and being responsive to illumination of its photosensitive cell for generating electrical binary signals;

a clock for generating pulses in response to the scanning of said clock indicia;

a plurality of shift registers, one for each sensor, for storing said binary signals in response to said clock pulses;

means responsive to said binary signals for measuring the vertical spaced relationship of said first key indicium with said one predetermined clock indicium; and, means comparing said measured vertical spaced relationship of said first key indicium with said vertical spaced relationship of said second key indicium for generating a valid signal when said comparison shows said relationships are compatible and for generating an invalid signal when said comparison shows said relationships are incompatible.

2. An optical reader as recited in claim 1 wherein said key indicia are in a common indicia row and said measuring means comprises:

counting means responsive to said clock pulses for generating a first gate qualification signal when said one predetermined clock indicium is scanned and for generating a second gate qualification signal when said other predetermined clock indicium is scanned;

first gating means qualified by said first gate qualification signal and responsive to said binary signals for generating a first gate output; and wherein said comparing means comprises:

bistable means triggered by said first gate output;

second gating means qualified by said second gate qualification signal and responsive to said binary signals and to the state of said bistable means for generating a second gate output; and means responsive to said second gate output for generating said valid and invalid signal.

3. An optical reader as recited in claim 2 wherein said vertical spaced relationship of said predetermined one of said clock indicia denotes the general information content of said indicia and with additionally:

third gating means responsive to the state of said bistable means for connecting said binary signals to said shift registers in a predetermined manner.

4. An optical reader as recited in claim 3 with additionally:

means for generating binary words correlative to said binary signals stored in said plurality of shift registers; and, a master shift register means for storing said binary words in a predetermined order.

5. An optical reader as recited in claim 4 wherein said means for generating binary words comprises:

means for extracting said binary signals for s aid plurality of shift registers in an orderly serially by bit manner; and, means for generating binary words correlative to said extracted binary signals.

6. An optical sensor and circuit comprising:

a fiber optic bundle partially split longitudinally into first and second legs and a trunk, said first and second legs terminating in first and second ends respectively and said trunk terminating in a trunk end, said ends being the ends of the fiber optics comprising the respective sections of the bundle;

a light source for illuminating said first ends;

a voltage source;

a photosensitive first transistor having base, emitter and collector electrodes, said base electrode being connected to receive illumination from said second sensor end and said emitter-collector electrodes being resistively connected across said voltage source;

a second transistor having second base, emitter and collector electrodes, said base electrode being connected to the emitter collector circuit of said first transistor and said second emitter collector circuit being connected resistively adjustable across said voltage source; and, thresholding means responsive to the voltage level in said second emitter collector circuit for generating binary output signals.

7. An optical sensor and sensor circuit as recited in claim 6 wherein said thresholding means comprises:

a first diode resistively coupled across said second emitter collector circuit;

an output terminal; and, a second diode coupled between said output terminal and said first diode, anode to cathode with said first diode.